C. A. NERACHER.
MEANS FOR PROPELLING BICYCLES AND THE LIKE.
APPLICATION FILED MAY 31, 1916.

1,269,558.

Patented June 11, 1918.
2 SHEETS—SHEET 1.

INVENTOR
Carl A. Neracher
BY J. O. Richey
ATTORNEY

C. A. NERACHER.
MEANS FOR PROPELLING BICYCLES AND THE LIKE.
APPLICATION FILED MAY 31, 1916.

1,269,558.

Patented June 11, 1918.
2 SHEETS—SHEET 2.

INVENTOR.
Carl A. Neracher
BY J. O. Richey
ATTORNEY

UNITED STATES PATENT OFFICE.

CARL A. NERACHER, OF NEW YORK, N. Y., ASSIGNOR TO THE BROPHY ENGINEERING COMPANY, OF CLEVELAND, OHIO, A CORPORATION OF OHIO.

MEANS FOR PROPELLING BICYCLES AND THE LIKE.

1,269,558.     Specification of Letters Patent.     Patented June 11, 1918.

Original application filed October 1, 1914, Serial No. 864,520. Divided and this application filed May 31, 1916. Serial No. 100,930.

*To all whom it may concern:*

Be it known that I, CARL A. NERACHER, a citizen of the United States, and a resident of New York, in the county of New York and State of New York, have invented certain new and useful Improvements in Means for Propelling Bicycles and the like; and I do hereby declare the following to be a full, clear, and exact description of the invention, such as will enable others skilled in the art to which it appertains to make and use the same.

My invention relates to means for propelling vehicles, such as bicycles, motorcycles and the like, one of the objects of my invention being to provide a simple, light and compact power plant, which can be conveniently mounted upon a relatively light frame, and which will operate the vehicle smoothly and without material vibrations.

Another object of my invention is the provision of means so that the weight of the power plant will be properly distributed through the frame work upon which it is used. I also aim to produce a device which will be inexpensive to manufacture and assemble, and which will be accessible for adjustment, replacements or repairs.

Other objects of my invention and the invention itself will probably be better understood from a description of an embodiment of the invention.

This application is a division of my application No. 864,520, filed October 1st, 1914.

Figure 1:
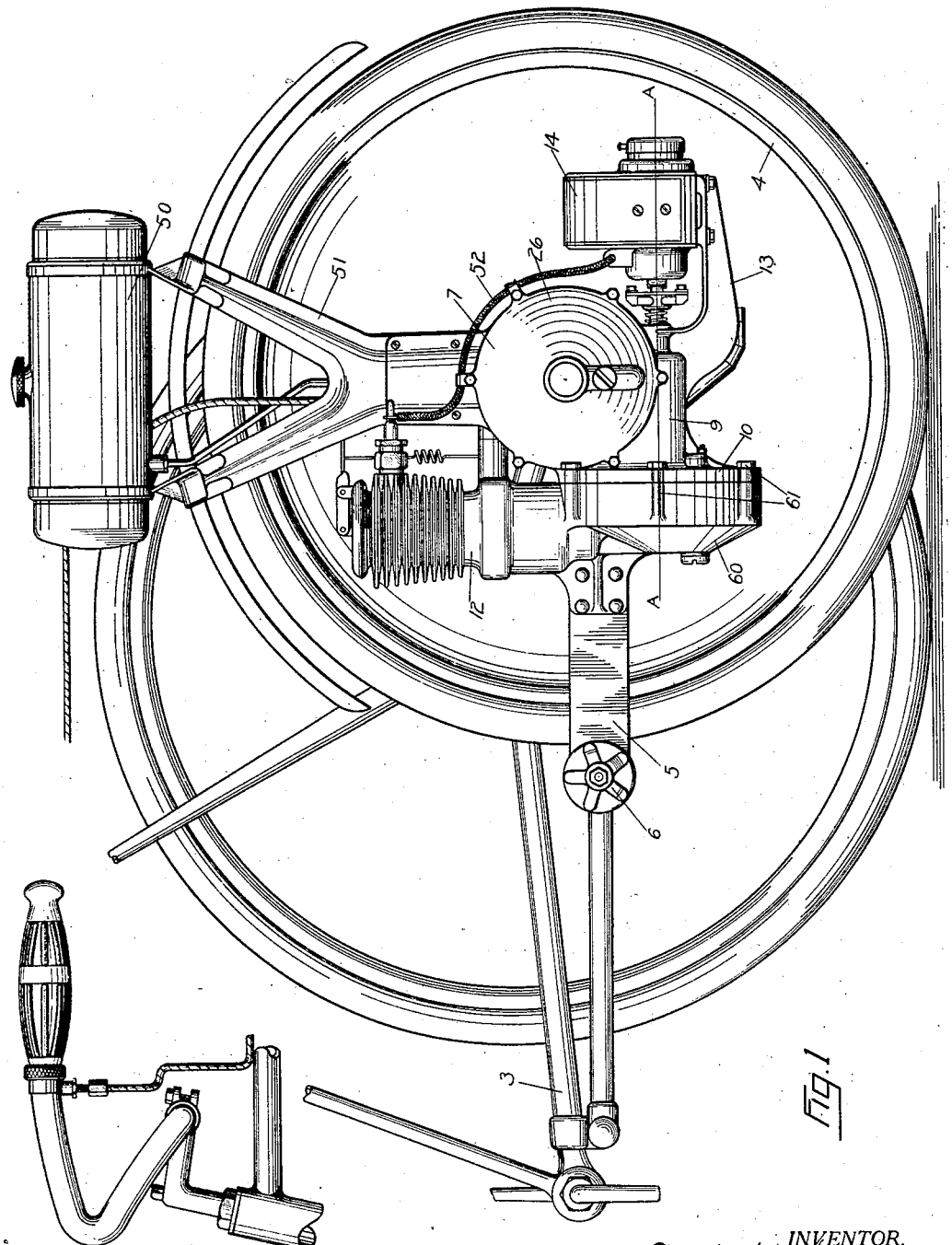
Figure 1 is a side elevation of a portion of a vehicle and an embodiment of my invention associated therewith.
Figure 2:
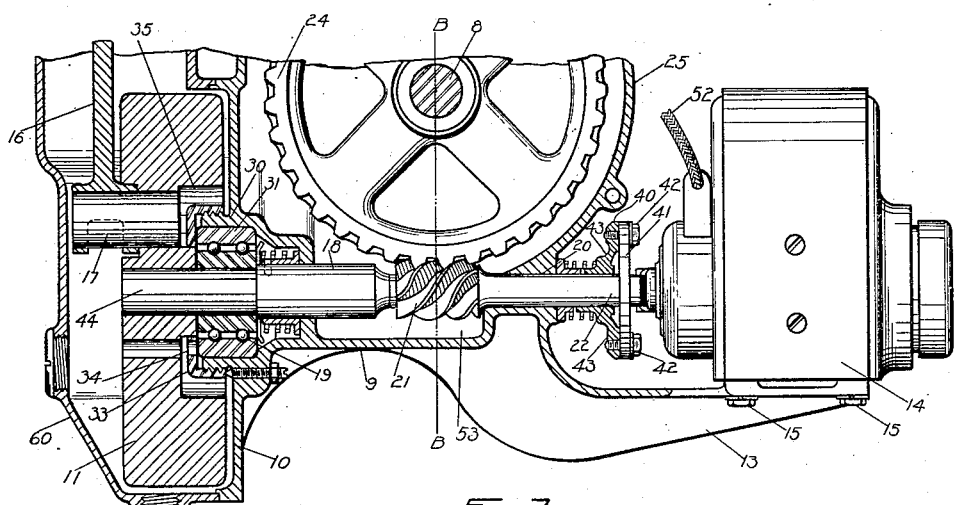
Fig. 2 is a sectional view of the parts shown in Fig. 1, through the line A—A of Fig. 1.
Figure 3:
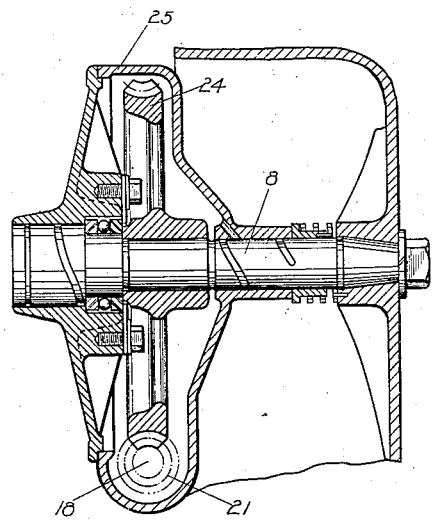
Fig. 3 is a transverse sectional view of the embodiment illustrated in Fig. 1.

Referring now to the drawings and the embodiment of my invention illustrated and in which I have shown the invention employed in connection with a bicycle, the frame of the bicycle generally is illustrated by the portions shown at 3. As bicycle frames and their structure are well understood, I have illustrated only portions of one of these machines in the drawing.

In the embodiment illustrated in the drawing, the unitary power plant is mounted upon an auxiliary wheel, shown at 4, which is connected through a flat spring 5 and pivot 6, or other suitable means, to the frame of the bicycle. While I have illustrated this particular manner of associating the unitary power plant with the vehicle, it will be apparent that it may be associated in any suitable manner. The power plant frame or casing is illustrated at 9. One end, here for convenience called the forward end, of the casing is provided with an expanded portion 10 constituting one wall of a fly wheel casing. The other portion of the fly wheel casing, here shown at 60, is connected to the portion 10 by any suitable connecting means, such as bolts 61. The unitary power plant is shown generally at 7 and is connected in the frame in any suitable manner. The shaft to be driven and through which the vehicle is propelled is shown at 8.

The power plant frame or casing is provided with a plurality of bearings 19 and 20, one on each side of the shaft 8. The bearing 19 consists of a ring and ball bearing mounted in a recess 31 in the frame or casing formed by an inwardly extending collar 30, which projects into the fly wheel casing. A collar 33 is provided for retaining the bearing in the recess, which is provided with an inwardly turned collar 34 engaging one end of the bearing. The member 33 is connected to the collar 30 by any suitable means, such as inter-engaging threads. A drive shaft is mounted in the bearings 19 and 20, extending substantially perpendicularly to the shaft 8, and being mounted below the same. For convenience, I have illustrated the shaft as continuous, as for the purpose of this invention it will not be necessary to illustrate the apparatus so as to produce more than one speed, though obviously any convenient form of change speed gears might be employed with my invention.

A worm or spiral gear 21 is provided upon the drive shaft meshing with the teeth of a worm or spiral gear wheel 24 connected to the shaft 8. The worm 21 is mounted upon the shaft intermediate of its ends and intermediate the bearings 19 and 20. A fly wheel 11 is connected to one end 44 of the shaft 18, which, for convenience, will be called the front end of the shaft. The fly wheel is provided with a recess 35 into which the bearing 19 projects. A crank pin 17 is connected to the fly wheel and the piston rod 16 is connected to this crank pin.

The engine, here shown as a single cylinder hydro-carbon engine, is illustrated at 12, being moutned upon one end of the frame or casing. The frame or casing is provided with an extension 13 which carries a magneto 14 connected thereto in any suitable manner, such as by bolts 15. Extending from the shaft 18 is a magneto driving shaft illustrated at 22 and here shown integral with the drive shaft 18 and constituting a part thereof. The movable member of the magneto is connected to 22 in any suitable manner. In the form shown a spider 40 is connected to the shaft, so as to rotate therewith, and the arms 43 of the spider are connected by any suitable means, such as bolts 42, to a web 41, which is connected to the movable member of the megneto.

The frame is provided with a casing 25 for the wheel 24 and this casing is inclosed by a cover 26 connected to the casing 25 in any suitable manner. A gear casing 53 is formed in the frame for the worm 21. The fluid tank is shown at 50 mounted upon a frame 51 connected to the casing 9. The electrical conductors connecting the magneto and the spark plug of the engine are shown at 52.

The engine is started in any suitable manner, such as by propelling the vehicle, and when started, the fly wheel is rotated perpendicularly to the drive shaft 18, through the piston rod, the crank pin and the fly wheel. The engine causes the operation of the drive shaft, which operates the magneto and drives the vehicle through the worm, the worm wheel and the shaft 18.

The power plant constitutes a unitary structure which is removable from the vehicle as a whole. The parts of the power plant are simple, easily and cheaply made and can be quickly and easily disassembled for repairs and reassembled. The parts and the operation are simple and durable and such adjustments as are to be made can be readily and conveniently made.

While I have illustrated this particular form of my invention and the particular details of apparatus illustrated therein, this has been done for the purpose of better explaining my invention. It will readily be understood that many departures may be made from the forms and details illustrated, without departing from the spirit of the invention.

I claim:—

1. In a vehicle propelling apparatus, the combination of a shaft to be driven, a worm gear wheel upon said shaft, a power plant frame, a casing, a drive shaft in said frame, a worm upon said shaft intermediate the ends thereof meshing with said worm gear wheel, a pair of bearings in said frame for said shaft, one on either side of said worm, one of said bearings being a ball and ring bearing, a hydro-carbon engine on one end of said frame, a fly wheel on one end of said shaft in one end of said frame, a casing on one end of said frame for said fly wheel, a crank pin in said fly wheel, a piston rod for the engine connected to said crank pin, an inwardly projecting collar on said fly wheel casing, forming a recess for said ball and ring bearing, said collar being exteriorly threaded, a ring provided with threads to engage with the threads on the collar, an inwardly projecting flange on said ring to engage the ball and ring bearing and to hold said bearing in said recess, said fly wheel being provided with a recess from one end of said ball and ring bearing, a magneto connected in the other end of said frame, a spider connected on the other end of said shaft and a web connected to the moving part of the magneto connected to said spider, thereby connecting the magneto to the shaft.

2. In a vehicle propelling apparatus, the combination of a shaft to be driven, a worm gear wheel mounted on said shaft, a frame, a hydro-carbon engine in one end of said frame and a magneto in the other end of said frame, a pair of bearings in said frame, one on each side of said shaft to be driven, a drive shaft mounted in said bearings, a worm on said drive shaft intermediate said bearings meshing with the worm wheel, a fly wheel on one end of said shaft provided with a recess, one of said bearings extending into said recess, a crank pin on said fly wheel, a piston rod connected to said crank pin and means to connect the magneto to the other end of said drive shaft.

3. In a vehicle propelling apparatus, the combination of a shaft to be driven, a worm wheel mounted on said shaft, a frame provided with a tail extension, a hydro-carbon engine in said frame on one side of said shaft, a magneto carried by said tail extension on the other side of said shaft, a pair of bearings, one on each side of said shaft, a drive shaft extending perpendicularly to the shaft to be driven mounted in said bearings, a worm on said drive shaft meshing with the worm wheel, a fly wheel on one end of said drive shaft provided with a recess, one of said bearings extending into said recess, a crank pin on the fly wheel, a piston rod for the engine connected to the crank pin and mechanism to connect the magneto to the other end of the drive shaft.

4. In a vehicle propelling apparatus, the combination of a driven shaft, a worm gear wheel mounted on said shaft, a power plant casing or frame, a pair of bearings in said frame below said driven shaft and one on each side thereof, a drive shaft perpendicular to said driven shaft mounted below said driven shaft in said bearings, a worm gear on said drive shaft meshing with said worm gear wheel, a fly wheel connected to one end of said drive shaft rotatable in a plane perpendicular to said drive shaft, a crank pin in said fly wheel, a hydro-carbon engine in said frame, on one side of said driven shaft, a piston rod connected at one end to the engine and at the other end to the crank pin, said frame being provided with a tail extension, a magneto carried by said extension on the other end of said frame and the opposite side of said driven shaft from said engine, a magneto shaft on the end of the drive shaft, mechanism to connect said magneto with said magneto shaft and electric conductors connecting the magneto with said engine.

5. In a bicycle propelling apparatus, the combination of a hydro-carbon engine, a drive shaft, means through which the engine is connected to one end of said shaft and drives the same, a magneto connected to the other end of the shaft and driven thereby, a worm on said shaft intermediate the engine and magneto and mechanism including a worm gear wheel engaging said worm, through which the bicycle is driven from said drive shaft.

6. In a bicycle propelling mechanism, the combination of a hydro-carbon engine, a fly wheel for said engine, a crank pin connected to the fly wheel and to the piston rod of the engine, a drive shaft upon which the fly wheel is mounted, a frame, bearings in the frame for the drive shaft, a magneto connected to the other end of the shaft, electric conductors whereby the magneto controls the engine, a worm on said shaft intermediate the engine and magneto and mechanism including a worm gear wheel engaging said worm through which the bicycle is driven from said drive shaft.

7. In a bicycle propelling mechanism, the combination of a frame, a pair of bearings in said frame, a drive shaft in said bearings, a worm on said shaft intermediate said bearings, a hydro-carbon engine, means to connect said hydro-carbon engine to one end of said shaft, through which means the engine drives the shaft, a magneto in the frame connected to the other end of the shaft, an ignition circuit controlling the engine connected to the magneto and mechanism including a worm gear wheel engaging said worm, through which the bicycle is driven from said drive shaft.

8. In a vehicle propelling apparatus, the combination of a shaft to be driven, a worm gear wheel mounted on said shaft, a power plant casing or frame extending substantially perpendicularly to said driven shaft, a pair of bearings in said frame, one of which is a ring and ball bearing situated in said frame below said driven shaft and one on each side thereof, a drive shaft perpendicular to said driven shaft mounted in said frame below said driven shaft and in said bearings, a worm gear on said drive shaft below the worm wheel and meshing with said worm wheel, said worm being on said shaft between said bearings, a recessed fly wheel connected to the forward end of said drive shaft and rotatable in a plane perpendicular to said drive shaft, said ball and ring bearing extending into the recess in the fly wheel, a crank pin eccentrically located in said fly wheel, a hydro-carbon engine in the front end of said frame, a rod connecting the piston of the engine with the crank pin, said frame being provided with an extension, a magneto carried by said extension on the rear end of said frame and on the opposite side of the drive shaft from the engine, a magneto shaft connected to the drive shaft and rotatable therewith, mechanism to connect said magneto with said magneto shaft and electric conductors connecting the magneto with the engine.

9. In a bicycle propelling mechanism, the combination of a hydro-carbon engine, a drive shaft, a worm about said drive shaft, both the shaft and worm being driven by said engine, a magneto connected to the other end of the shaft and driven by said engine, said worm being intermediate said engine and magneto and mechanism including a worm gear wheel engaging said worm through which the bicycle is driven by the engine.

10. In a bicycle propelling mechanism, the combination of a hydro-carbon engine, a drive shaft, means through which the engine is connected to one end of said shaft and drives the same, a magneto connected to the other end of the shaft and driven therethrough, spiral threads about said shaft intermediate the engine and magneto and mechanism including a spiral gear wheel engaging said threads through which the bicycle is driven by the engine.

11. In a bicycle propelling apparatus, the combination of a power plant frame, a hydro-carbon engine in one end of the frame, a magneto in the other end driven by the engine, a driven shaft, a spiral gear wheel on said driven shaft, a drive shaft adapted to be driven by the engine and spiral threads about the drive shaft meshing with the spiral gear wheel teeth through which the engine drives the driven shaft and propels the bicycle.

12. In propelling apparatus for bicycles and the like, the combination of a hydro-carbon engine, drive shaft mechanism, spiral gear threads about said shaft mechanism, means through which the engine is connected to said mechanism on one side of said threads and through which the engine drives the shaft mechanism and the threads, a magneto connected to said mechanism on the other side of the threads and driven by said mechanism, and means including a spiral gear wheel engaging said threads through which the bicycle is driven from said drive shaft mechanism.

In witness whereof, I have signed my name hereunto this 23 day of May, 1916.

CARL A. NERACHER.

Copies of this patent may be obtained for five cents each, by addressing the "Commissioner of Patents, Washington, D. C."